No. 754,571. PATENTED MAR. 15, 1904.
W. S. KESSLER.
AUTOMOBILE LIFTING TRUCK.
APPLICATION FILED JULY 30, 1903.
NO MODEL. 2 SHEETS—SHEET 1.

WITNESSES:
Wm F. Doyle
J. K. Moore

INVENTOR
Warren S. Kessler
By Whitaker & Prevost
His Attorneys

No. 754,571. PATENTED MAR. 15, 1904.
W. S. KESSLER.
AUTOMOBILE LIFTING TRUCK.
APPLICATION FILED JULY 30, 1903.
NO MODEL. 2 SHEETS—SHEET 2.

WITNESSES
INVENTOR
Warren S. Kessler
By Whitaker & Prevost
His Attorneys

No. 754,571. Patented March 15, 1904.

UNITED STATES PATENT OFFICE.

WARREN S. KESSLER, OF ALBION, MICHIGAN.

AUTOMOBILE LIFTING-TRUCK.

SPECIFICATION forming part of Letters Patent No. 754,571, dated March 15, 1904.

Application filed July 30, 1903. Serial No. 167,637. (No model.)

*To all whom it may concern:*

Be it known that I, WARREN S. KESSLER, a citizen of the United States, residing at Albion, in the county of Calhoun and State of Michigan, have invented certain new and useful Improvements in Automobile Lifting-Trucks; and I do hereby declare the following to be a full, clear, and exact description of the invention, such as will enable others skilled in the art to which it appertains to make and use the same.

My present invention is an automobile lifting-truck; and it consists of a truck provided with a motor so connected as to propel it from place to place, lifting arms or platform, and a device for lifting and holding the said arms or platform at the required height.

In the accompanying drawings I have shown one form in which I have contemplated embodying my invention, and my said invention is disclosed in the following description and claims.

Figure 1:
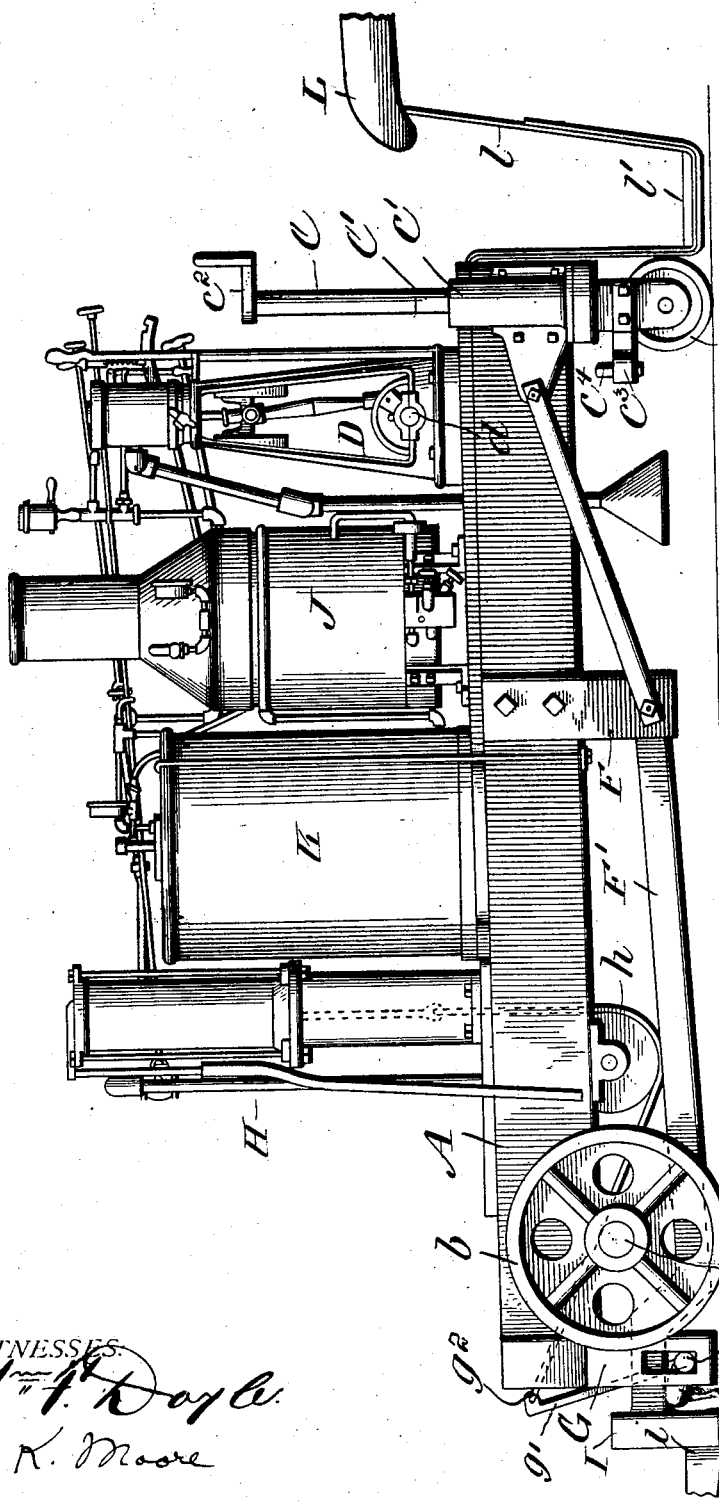
Figure 2:
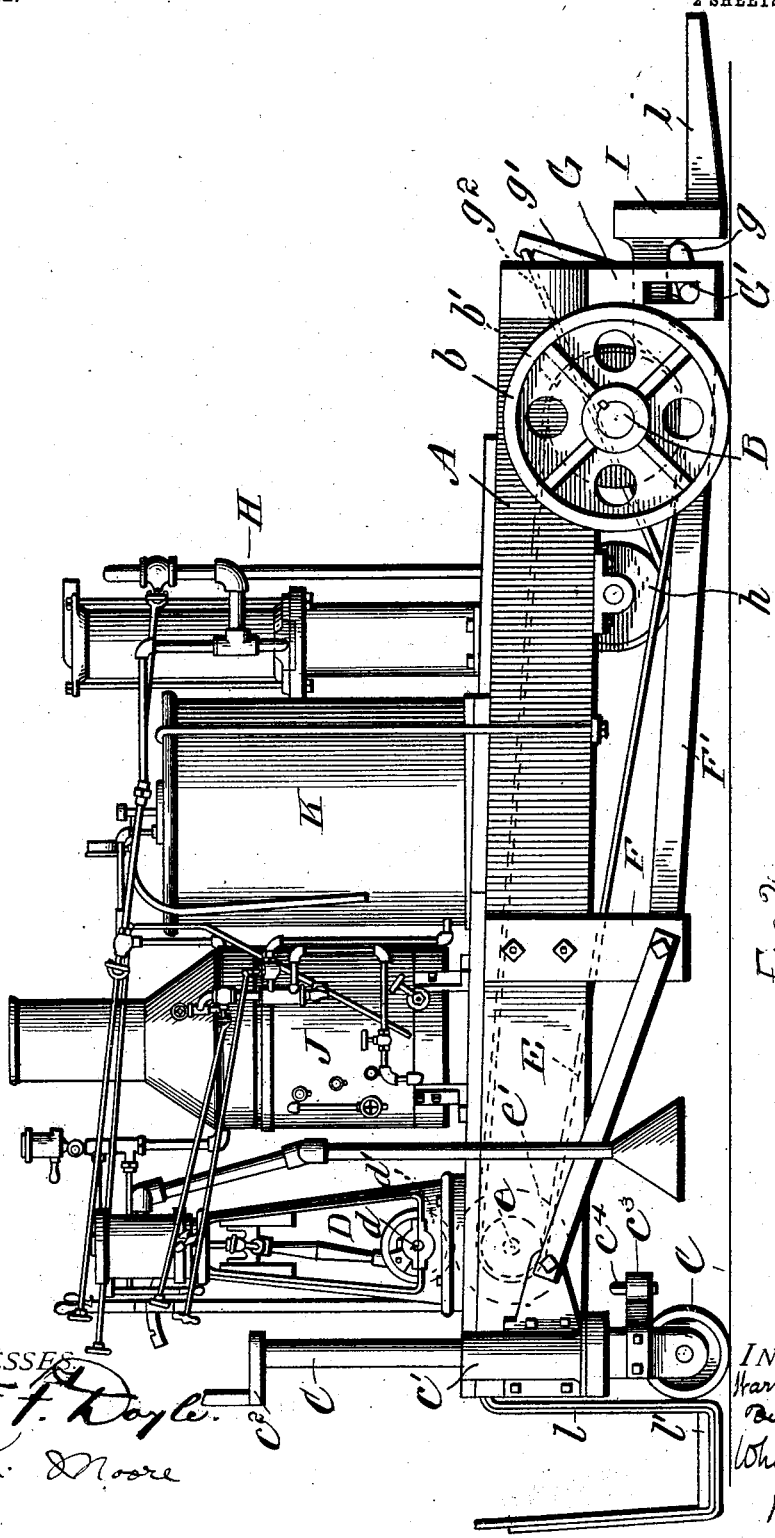

In the said drawings, Figure 1 is a view in side elevation of one of my improved trucks, and Fig. 2 is a view from the opposite side.

In the said drawings, A is the main supporting-frame of the machine. This main frame is supported at its forward end on the axle B of two truck-wheels $b$ $b$, the wheels being rigidly secured to the axle. The rear end of the frame is supported on two caster-wheels $c$ $c$. On each side of the frame A are mounted two vertical bearings $c'$ $c'$, in one of which is journaled the rod or shaft C. The lower end of this rod or shaft is bifurcated, and between the two arms of the bifurcated part is one of the caster-wheels $c$. The upper end of the rod or shaft C is provided with the crank-arm $c^2$, by which the wheel $c$, connected with the shaft or rod, can be turned in any direction. On the opposite side of the machine is a similar bearing in which there is mounted a similar shaft or rod $C'$, which extends but a short distance above the bearing $c'$, and its lower end is in like manner bifurcated and has rotatably mounted therein the other caster-wheel $c$. To each of the bifurcated caster-wheel supports is rigidly secured a forwardly-extending arm $c^3$ $c^3$, and these two arms are connected by the link $c^4$, so that the caster-wheels move in unison.

The motor D, which in this instance is a steam-engine, is mounted upon the main frame near the rear end of the same. Upon the engine-shaft $d$ is mounted a spur gear-wheel $d'$. This gear-wheel meshes with a gear-wheel on a counter-shaft $e$, mounted in the frame below the engine. On shaft $e$ is placed the small sprocket-wheel $e'$, and a sprocket-chain E connects this sprocket with a large sprocket $b'$ on the axle B.

The engine is preferably provided with reverse mechanism, by the aid of which the truck can be moved in either direction.

To the main frame, a short distance to the rear of the center of the same, are secured at each side depending brackets F, and to these brackets are pivoted the lifting-bars $F'$. These bars extend forwardly beyond the front end of the main frame, preferably passing through slots in brackets G, secured to the front end of the main frame and over a shaft $G'$, mounted in said brackets G. The shaft $G'$ is provided beneath the bars $F'$ with crank-arms or cams $g$.

To the center of the shaft $G'$ is rigidly secured the arm $g'$. To the upper end of the arm $g'$ is secured a flexible connection $g^2$, such as a chain or like article, which passes beneath and partially around the pulley $h$, secured beneath the frame, and then upward to the lifting device H. This lifting device is shown as being in this instance a steam-lift, and the chain or flexible connection $g^2$ is secured to the piston-rod of the steam-lift. To the outer ends of the lifting-bars $F'$ is secured a cross-head I, and from this cross-head projects the short arms or platform $i$.

J is the steam-boiler, and K is the water-tank, both of which are mounted upon the main frame, as shown.

L is the seat for the operator, and this is supported in any preferred way from the main frame. It is shown in this instance as being supported by the U-shaped bar or bars $l$, which at their lowest point carry a footboard $l'$ for the feet.

The truck here illustrated was designed for handling annealing-pots used in the manufacture of malleable iron, and the operation will be readily understood. The annealing-pots used in the manufacture referred to are supported upon bases, having downwardly-extending webs which rest on the flooring. The operator causes the truck to move forward and thrust the arms $i$ under the base, upon which one or more annealing-pots have been placed. The lift is then operated in this instance by admitting steam to the lower end of the cylinder and the rear end of the chain or flexible connection $g^2$ drawn upward. This draws the upper end of the arm $g'$ backward, causing the cams $g$ to raise the lifting-bars with the pots upon the arms $i$. The truck then is operated to carry the pots to the point desired, when the steam in the lifting-cylinder is allowed to escape slowly and the load is deposited.

While I have shown this truck as constructed for certain use, it may be constructed for other uses and adapted to lift its load such greater distances as may be desired, and the various parts may be modified to adapt the use for which it is intended.

What I claim, and desire to secure by Letters Patent, is—

1. An automobile-truck provided with lifting-bars having a lifting-platform rigidly secured thereto and means for raising and lowering said lifting arms and platform, substantially as described.

2. In an automobile-truck, the combination with the main body, of the lifting-bars, the cam-shaft for raising the same and means for actuating said shaft, substantially as described.

3. In an automobile-truck, the combination with the main body, of the lifting-bars, the cam-shaft for raising and lowering the said bars provided with the rigid arm, the flexible connection and the steam-cylinder for actuating said shaft, substantially as described.

In testimony whereof I affix my signature in the presence of two witnesses.

WARREN S. KESSLER.

Witnesses:
E. C. LESTER,
M. B. MURRAY.